(12) United States Patent
Huang et al.

(10) Patent No.: US 9,807,295 B1
(45) Date of Patent: Oct. 31, 2017

(54) LENS MODULE AND ELECTRONIC DEVICE HAVING THE SAME

(71) Applicant: HON HAI PRECISION INDUSTRY CO., LTD., New Taipei (TW)

(72) Inventors: Shi-Kai Huang, New Taipei (TW); Hsieh-Tung Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/194,767

(22) Filed: Jun. 28, 2016

(30) Foreign Application Priority Data

May 23, 2016 (CN) .......................... 2016 1 0342632

(51) Int. Cl.
| | |
|---|---|
| *H04N 5/372* | (2011.01) |
| *H04N 5/225* | (2006.01) |
| *H04N 5/232* | (2006.01) |
| *G02B 7/09* | (2006.01) |
| *G02B 7/02* | (2006.01) |
| *G03B 13/36* | (2006.01) |

(52) U.S. Cl.
CPC ......... *H04N 5/23212* (2013.01); *G02B 7/021* (2013.01); *G02B 7/09* (2013.01); *G03B 13/36* (2013.01); *H04N 5/2253* (2013.01); *H04N 5/2254* (2013.01); *H04N 5/372* (2013.01)

(58) Field of Classification Search
CPC ............. H04N 5/23212; H04N 5/2253; H04N 5/2254; H04N 5/372; G02B 7/021; G02B 7/09; G03B 13/36
See application file for complete search history.

(56) References Cited

U.S. PATENT DOCUMENTS

| | | | |
|---|---|---|---|
| 6,712,452 B1 * | 3/2004 | Silverbrook | ............... B41J 2/01 347/50 |
| 8,436,912 B2 * | 5/2013 | Kane | ..................... H04N 5/2226 348/222.1 |
| 9,031,393 B2 * | 5/2015 | Zhang | .................. H04N 5/2257 396/133 |

* cited by examiner

*Primary Examiner* — Twyler Haskins
*Assistant Examiner* — Fayez Bhuiyan
(74) *Attorney, Agent, or Firm* — Steven Reiss

(57) ABSTRACT

A lens module for autofocus of a camera in passive mode includes a lens barrel containing a first lens, a second lens, a pressure sensor, an image sensor, and a processor. In the passive autofocus mode, the first lens is located at a first end of the lens barrel and moves within the lens barrel when a distance to a target object changes. The pressure sensor between the first and the second lenses senses both pulling and pushing pressures which the first lens applies. The image sensor is adjacent to an end of the lens barrel and is behind the first and second lenses. The processor can apply formulas to calculate a distance between the target object and the lens module.

16 Claims, 4 Drawing Sheets

LENS MODULE AND ELECTRONIC DEVICE HAVING THE SAME

FIELD

The subject matter herein generally relates to a lens module and an electronic device having the lens module.

BACKGROUND

Many image capturing devices (such as cameras and cell phones) employ autofocus systems which can focus on selected points or areas. The autofocus system can be switched between an active autofocus mode and a passive autofocus mode. When the autofocus optical system is under the active autofocus mode, the autofocus system sends some form of energy towards the target object, analyses the reflection to determine a distance between the target object and the active autofocus system, and adjusts the lens according to the distance. When the autofocus optical system is under the passive autofocus mode, the autofocus system analyses the image of the target object without sending any energy towards object.

Thus, the image capturing device can determine the distance between the target object and the autofocus system only when the autofocus optical system is under the active autofocus mode. However, the autofocus system is under the active autofocus mode when the image capturing device is located in an environment with a low illumination. That is, the image capturing device cannot determine the distance between the target object and the autofocus system when the image capturing device is located in an environment with a high illumination.

BRIEF DESCRIPTION OF THE DRAWINGS

Implementations of the present technology will now be described, by way of example only, with reference to the attached figures.

DETAILED DESCRIPTION

Figure 1:
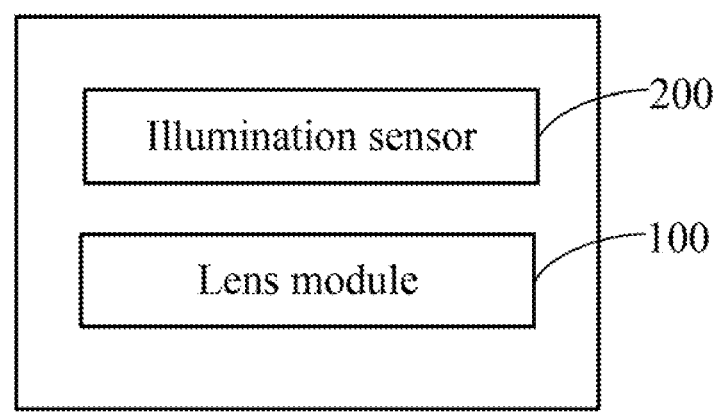
FIG. 1 is a block diagram of an embodiment of an electronic device including a lens module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
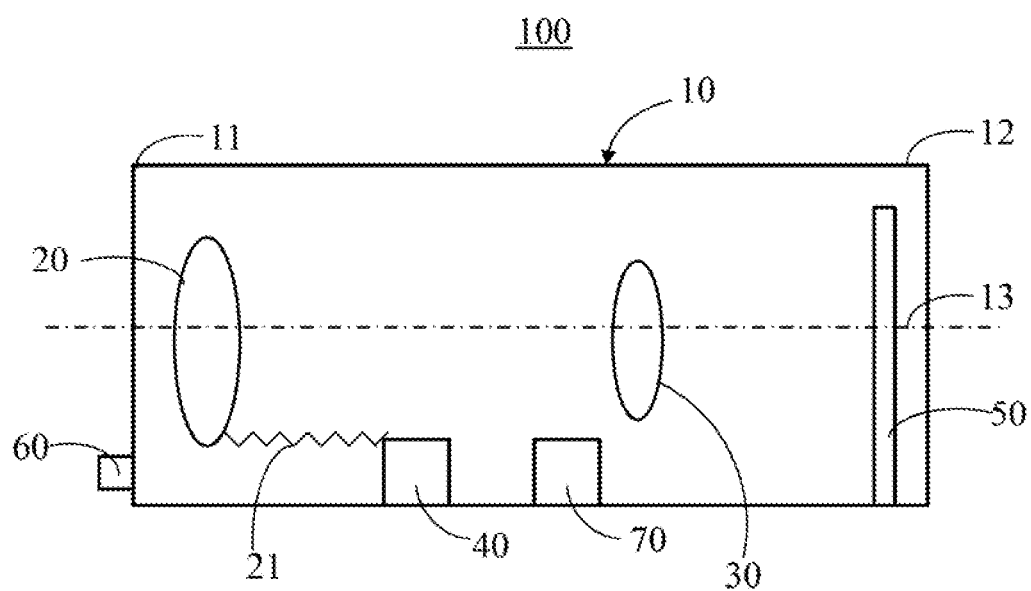
FIG. 2 is diagrammatic view of the lens module of FIG. 1.

FIGS. 1 and 2 illustrate an exemplary embodiment of a lens module 100 applied in an electronic device 1. The electronic device 1 can be a camera, a tablet computer, or a smart phone.

The lens module 100 comprises a lens barrel 10, a first lens 20, a second lens 30, a pressure sensor 40, an image sensor 50, a distance detector 60, and a processor 70.

The first lens 20, the second lens 30, the pressure sensor 40, the image sensor 50, and the processor 70 are mounted inside the lens barrel 10. The lens barrel 10 has a first end 11, closest to a subject to be photographed, a second end 12 opposite to the first end 11, and an optical axis 13 passing through the first end 11 and the second end 12. The first lens 20 is located at a first end of the lens barrel 10. The image sensor 50 is located at the second end 12 of the lens barrel 10. The second lens 30 is positioned between the first lens 20 and the image sensor 50. The pressure sensor 40 is positioned between the first lens 20 and the second lens 30. The distance detector 60 is located outside the lens barrel 10 and mounted to the first end 11 of the lens barrel 10. In at least one embodiment, the image sensor 50 is a complementary metal oxide semiconductor (CMOS) or a charge-coupled device (CCD).

The lens module 100 can be manually or automatically switched between an active autofocus function and a passive autofocus function. When the lens module 100 is in an environment with a low ambient illumination, the lens module 100 is switched to an active autofocus mode. When the lens module 100 is under the active autofocus mode, the lens module 100 sends some form of energy towards a target object 2 (shown in FIGS. 3 and 4), analyses the reflection to determine a distance between the target object 2 and the lens module 100, and adjusts the first lens 20 according to the determined distance (that is, the active autofocus function). When the lens module 100 is in an environment with a high ambient illumination, the lens module 100 is switched to a passive autofocus mode. When the lens module 100 is under the passive autofocus module, the lens module 100 analyses an image resolution of an image of the target object 2 formed in the image sensor 50 without sending any energy towards the target object 2, and adjusts the first lens 20 according to the image resolution (that is, the passive autofocus function).

In at least one exemplary embodiment, the lens module 100 is automatically switched between the active autofocus function and the passive autofocus function. The electronic device 1 further comprises an illumination sensor 200. The illumination sensor 200 periodically detects an ambient illumination of the environment in which the electronic device 1 is located. The illumination sensor 200 can be a photosensitive diode, a photosensitive triode, or a photosensitive resistor. The detection of the ambient illumination implemented by the photosensitive diode, the photosensitive triode, or the photosensitive resistor is a well known technique, thus a detailed description is omitted. When the detected ambient illumination is greater than a default threshold, the electronic device 1 controls the lens module 100 to switch to the passive autofocus mode. When the detected ambient illumination is less than or equal to the default threshold, the electronic device 1 controls the lens module 100 to switch to the active autofocus mode. In at least one embodiment, the default threshold, usually preset before the electronic device 1 is put on the market, is of about 20 candela.

In other exemplary embodiments, the lens module 100 is manually switched between the active autofocus function and the passive autofocus function, and the illumination sensor 200 is omitted. The electronic device 1 may further comprise a button (not shown) for controlling the lens module 100 to switch between the passive autofocus mode and the active autofocus module. The button can be a virtual button or a mechanical button.

Figure 3:
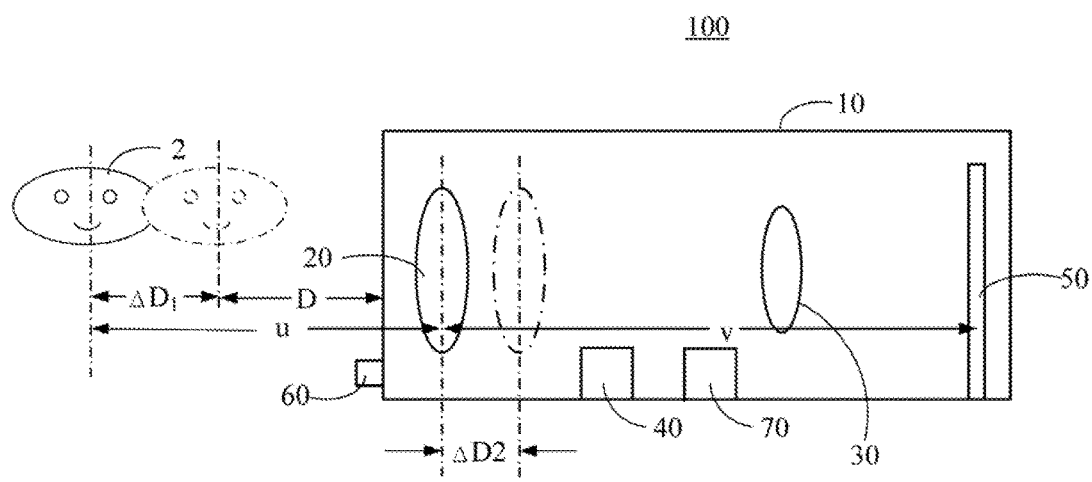
FIG. 3 is a diagrammatic view showing the lens module of FIG. 2 under a passive autofocus module.

FIG. 3 illustrates that when the lens module 100 is under the passive autofocus mode, the first lens 20 moves within the lens barrel 10 when distance between a target object 2 and the lens module 100 is changed (that is, when the target object 2 moves towards or away from the lens module 100). The lens module 100 is thus enabled to focus on the target object 2 and to perform the passive autofocus function.

As shown in FIG. 2, the pressure sensor 40 senses a pressure, such as the pressure the first lens 20 applies to the pressure sensor 40 through the expansion or contraction of an elastic member 21 as the first lens 20 moves away or toward the pressure sensor 40.

As previously mentioned, in at least one embodiment, the first lens 20 is connected to the pressure sensor 40 by the elastic member 21 such as a coiled spring. The elastic member 21 is elastically deformed when the first lens 20 moves, thereby applying pressure to the pressure sensor 40. More specifically, the elastic member 21 is in a natural state when the first lens 20 is in an original position. When the first lens 20 moves towards the target object 2, the elastic member 21 applies a pulling pressure to the pressure sensor 40. When the first lens 20 moves away from the target object 2, the elastic member 21 applies a pushing pressure to the pressure sensor 40.

The processor 70 calculates a moving distance $\Delta D_2$ of the first lens 20 according to a pressure value of the sensed pressure. In at least one embodiment, the pressure value is proportional to the moving distance $\Delta D_2$ of the first lens 20.

The processor 70 further calculates a moving distance $\Delta D_1$ of the target object 2 according to the moving distance $\Delta D_2$ of the first lens 20, and then calculates a distance D between the target object 2 and the lens module 100 according to the moving distance $\Delta D_1$ of the target object 2. In at least one embodiment, before the target object 2 moves towards or away from the lens module 100, a distance between the target object 2 and the first lens 20 is defined as an original target object distance equaling u. A distance between the image sensor 50 and the first lens 20 is defined as an original image distance equaling v, and the focal length of the first lens 20 equals f. Then, the processor 70 can calculate the original target object distance u according to the original image distance v and the focal length f based on the function, $$\frac{1}{u} = \frac{1}{v} + \frac{1}{f}.$$

After the target object 2 moves towards or away from the lens module 100, the moving distance $\Delta D_1$ of the target object 2 can be calculated according to the original target object distance u, the original image distance v, the focal length f, and the moving distance $\Delta D_2$ of the first lens 20 based on the function, $$\frac{1}{u - \Delta D_1} = \frac{1}{v - \Delta D_2} + \frac{1}{f}.$$

Then, the distance D between the target object 2 and the lens module 100 can approximately be calculated according to the original target object distance u and the moving distance $\Delta D_1$ of the target object 2 based on the function, $D = u - \Delta D_1$.

With the above configuration, when the lens module 100 is in an environment with a high ambient illumination and is switched to the passive autofocus mode, the lens module 100 can also determine the distance D between the target object 2 and the lens module 100.

Figure 4:
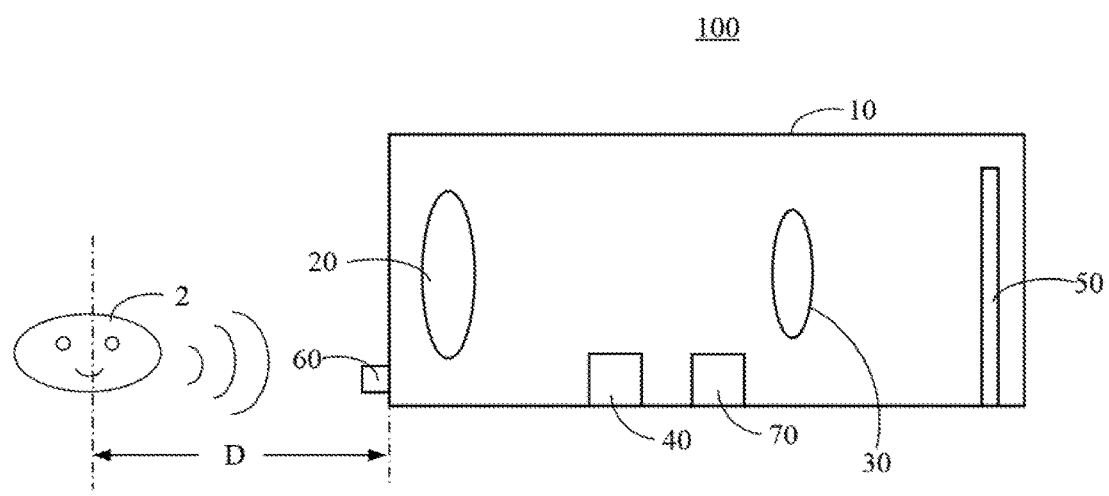
FIG. 4 is a diagrammatic view showing the lens module of FIG. 2 under an active autofocus module.

FIG. 4 illustrates that when the lens module 100 is under the active autofocus mode, the distance detector 60 detects the distance between the target object 2 and the lens module 100, thereby allowing the lens module 100 to focus on the target object 2 and to perform the active autofocus function. In at least one embodiment, the distance detector 60 is an infrared detector or an ultrasonic detector.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments, to the full extent indicated by the plain meaning of the terms in which the appended claims are expressed.

What is claimed is:

1. A lens module comprising:
a lens barrel having a first end and an opposite second end;
a first lens mounted inside the lens barrel and located at the first end; wherein in the passive autofocus mode, the first lens is configured to move within the lens barrel when a distance between a target object and the lens module is changed, thereby the lens module focuses on the target object and performs a passive autofocus function;
a second lens mounted inside the lens barrel;
a pressure sensor mounted inside the lens barrel and positioned between the first lens and the second lens; wherein the pressure sensor is configured to sense a pressure applied by the first lens when the first lens moves;
an image sensor mounted inside the lens barrel and located at the second end, the second lens positioned between the first lens and the image sensor; and
a processor mounted inside the lens barrel, and the processor configured to calculate a moving distance of the first lens according to a pressure value of the sensed pressure, calculate a moving distance of the target object according to the moving distance of the first lens, and calculate a distance between the target object and the lens module according to the moving distance of the target object.

2. The lens module of claim 1, wherein the processor is configured to calculate an original target object distance between the target object and the first lens according to an original image distance between the image sensor and the first lens and a focal length of the first lens, calculate the moving distance of the target object according to the original target object distance, the original image distance, the focal length, and the moving distance of the first lens, and calculate the distance between the target object and the lens module according to the original target object distance and the moving distance of the target object.

3. The lens module of claim 1, wherein the first lens is connected to the pressure sensor by an elastic member; and the elastic member is elastically deformed when the first lens moves, thereby pressure is applied to the pressure sensor.

4. The lens module of claim 1 further comprising a distance detector; wherein the distance detector is located outside the lens barrel and mounted to the first end, and is configured to detect the distance between the target object and the lens module when the lens module is under an active autofocus mode, thereby the lens module focuses on the target object and performs an active autofocus function.

5. The lens module of claim 4, wherein the distance detector is an infrared detector.

6. The lens module of claim 4, wherein the distance detector is an ultrasonic detector.

7. The lens module of claim 1, wherein the image sensor is a complementary metal oxide semiconductor.

8. The lens module of claim 1, wherein the image sensor is a charge-coupled device.

9. An electronic device comprising:
a lens module for use in a passive autofocus mode comprising:
a lens barrel having a first end and an opposite second end;
a first lens mounted inside the lens barrel and located at the first end; wherein in the passive autofocus mode, the first lens is configured to move within the lens barrel when a distance between a target object and the lens module is changed, thereby the lens module focuses on the target object and performs a passive autofocus function;
a second lens mounted inside the lens barrel;
a pressure sensor mounted inside the lens barrel and positioned between the first lens and the second lens; wherein the pressure sensor is configured to sense a pressure applied by the first lens when the first lens moves;
an image sensor mounted inside the lens barrel and located at the second end, the second lens positioned between the first lens and the image sensor; and
a processor mounted inside the lens barrel, and the processor configured to calculate a moving distance of the first lens according to a pressure value of the sensed pressure, calculate a moving distance of the target object according to the moving distance of the first lens, and calculate a distance between the target object and the lens module according to the moving distance of the target object.

10. The electronic device of claim 9, wherein the processor is configured to calculate an original target object distance between the target object and the first lens according to an original image distance between the image sensor and the first lens and a focal length of the first lens, calculate the moving distance of the target object according to the original target object distance, the original image distance, the focal length, and the moving distance of the first lens, and calculate the distance between the target object and the lens module according to the original target object distance and the moving distance of the target object.

11. The electronic device of claim 9, wherein the first lens is connected to the pressure sensor by an elastic member; the elastic member is elastically deformed when the first lens moves, thereby pressure is applied to the pressure sensor.

12. The electronic device of claim 9, wherein the lens module further comprises a distance detector located outside the lens barrel and mounted to the first end; the distance detector is configured to detect the distance between the target object and the lens module when the lens module is under an active autofocus mode, thereby the lens module focuses on the target object and performs an active autofocus function.

13. The electronic device of claim 12 further comprises an illumination sensor, wherein the illumination sensor is configured to periodically detect an ambient illumination of an environment surrounding the electronic device; the electronic device controls the lens module to switch to the passive autofocus mode when the detected ambient illumination is greater than a default threshold, and controls the lens module to switch to the active autofocus mode when the detected ambient illumination is less than or equal to the default threshold.

14. The electronic device of claim 13, wherein the illumination sensor is a photosensitive diode.

15. The electronic device of claim 13, wherein the illumination sensor is a photosensitive triode.

16. The electronic device of claim 13, wherein the illumination sensor is a photosensitive resistor.

\* \* \* \* \*